US009417262B2

(12) United States Patent
Nakata et al.

(10) Patent No.: US 9,417,262 B2
(45) Date of Patent: Aug. 16, 2016

(54) SCANNING PROBE MICROSCOPE AND SAMPLE OBSERVATION METHOD USING SAME

(71) Applicant: HITACHI, LTD., Chiyoda-ku, Tokyo (JP)

(72) Inventors: Toshihiko Nakata, Tokyo (JP); Shuichi Baba, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/654,522

(22) PCT Filed: Oct. 28, 2013

(86) PCT No.: PCT/JP2013/079063
§ 371 (c)(1),
(2) Date: Jun. 20, 2015

(87) PCT Pub. No.: WO2014/115391
PCT Pub. Date: Jul. 31, 2014

(65) Prior Publication Data
US 2015/0377922 A1 Dec. 31, 2015

(30) Foreign Application Priority Data

Jan. 25, 2013 (JP) .................. 2013-011604

(51) Int. Cl.
*G01Q 30/14* (2010.01)
*G01Q 60/22* (2010.01)
(Continued)

(52) U.S. Cl.
CPC ............... *G01Q 60/22* (2013.01); *G01Q 30/14* (2013.01); *B82Y 20/00* (2013.01); *B82Y 35/00* (2013.01)

(58) Field of Classification Search
CPC ........ B82Y 35/00; B82Y 20/00; G01Q 30/14; G01Q 60/22; G01Q 60/06; G01Q 60/38; G01Q 20/02; Y10S 977/862; G01N 15/1427
USPC ........... 850/30, 1, 14, 18, 24, 32, 33, 43, 5, 6, 850/63; 250/16, 234, 461.1
See application file for complete search history.

(56) References Cited

U.S. PATENT DOCUMENTS 5,821,409 A * 10/1998 Honma .................. B82Y 20/00
73/105
6,515,274 B1 * 2/2003 Moskovits ............. B82Y 20/00
250/216

(Continued)

FOREIGN PATENT DOCUMENTS

EP 0 701 102 A1 3/1996
EP 1 054 283 A2 11/2010

(Continued)

OTHER PUBLICATIONS

Pangaribuan, T., et al., "Reproducible Fabrication Technique of Nanometric Tip Diameter Fiber Probe for Photon Scanning Tunneling Microscope", Japanese Journal of Applied Physics; vol. 31; pp. L1302-1304 (1992).

(Continued)

*Primary Examiner* — David A Vanore
(74) *Attorney, Agent, or Firm* — Miles & Stockbridge P.C.

(57) ABSTRACT

The purpose of the present invention is to increase the detection light amount of near-field light, which is generated in a liquid between a measurement probe and a sample-to-be-inspected, at the time of employing a near-field scanning microscope for measurement in a liquid, and to improve measurement reproducibility and the SN ratio of near-field light images. The present invention provides a scanning probe microscope comprising: a measurement probe that is relatively scanned over a sample-to-be-inspected; a laser beam irradiation system that irradiates the measurement probe with a laser beam; a sample cell that holds the sample-to-be-inspected and that transmits scattered light of near-field light generated between the measurement probe and the sample-to-be-inspected by the laser beam irradiation; and a detector that detects the scattered light that has passed through the sample cell.

12 Claims, 6 Drawing Sheets

(51) Int. Cl.
*B82Y 20/00* (2011.01)
*B82Y 35/00* (2011.01)

(56) References Cited

U.S. PATENT DOCUMENTS

| | | | | |
|---|---|---|---|---|
| 8,181,267 | B2* | 5/2012 | Kobayashi | G01Q 30/14 850/1 |
| 8,536,545 | B2* | 9/2013 | Wu | G01N 15/1427 250/461.1 |
| 9,140,720 | B2* | 9/2015 | Kim | G01Q 30/14 |
| 2011/0131690 | A1* | 6/2011 | Novak | B82Y 35/00 850/43 |
| 2015/0377922 | A1* | 12/2015 | Nakata | G01Q 30/14 850/32 |

FOREIGN PATENT DOCUMENTS

| | | |
|---|---|---|
| JP | 2002-267590 A | 9/2002 |
| JP | 2006-515682 A | 6/2006 |
| JP | 2011-242308 A | 12/2011 |
| WO | WO 2004/048285 A1 | 6/2004 |

OTHER PUBLICATIONS

Inoue, Y., et al., "Near-field scanning optical microscope with a metallic probe tip", Optics Letters; vol. 19;No. 3, pp. 159-161 (1994).
International Search Report from International Patent Application No. PCT/JP2013/079063, Jan. 14, 2014.

* cited by examiner

SCANNING PROBE MICROSCOPE AND SAMPLE OBSERVATION METHOD USING SAME

TECHNICAL FIELD

The present invention relates to a scanning probe microscope technique and a sample observation method using the same.

BACKGROUND ART

There is known a scanning near-field optical microscope (SNOM) as a means of measuring the optical property and physical property information of the surface of a sample with high resolution. This microscope is to measure the optical properties such as the reflectance distribution and the refractive index distribution of the surface of a sample with resolution of several tens nm as large as a minute opening of several tens nm and exceeding the diffraction limitation of light by making scanning by near-field light leaking from the minute opening while maintaining a gap between the opening and a sample to be several tens nm likewise (opening probe), as disclosed in a non-patent literature 1. As a similar method, a non-patent literature 2 discloses a method in which a metal probe is irradiated with light externally and scanning is made by near-field light as large as several tens nm and scattered on a minute pointed end of the probe (scattering probe).

Further, a patent literature 1 discloses a method in which a minute spherical lens is formed at a pointed end of a fiber to form a minute spotlight as another aspect of the scattering probe.

Moreover, a patent literature 2 discloses a method in which a carbon nanotube is filled with metal carbide such as V, Y, Ta, Sb or the like or fluorescent substance such as ZnS or CaS which generates photo-luminescence or electro-luminescence and a minute spotlight is obtained as another aspect of the scattering probe similarly.

CITATION LIST

Patent Literature

PATENT LITERATURE 1: JP-A-2006-515682
PATENT LITERATURE 2: JP-A-2002-267590

Non-Patent Literature

NON-PATENT LITERATURE 1: Japanese Journal of Applied Physics, Vol. 31, pp. L1302-L1304 (1992)
NON-PATENT LITERATURE 2: Optics Letters, Vol. 19, pp. 159-16 (1994)

SUMMARY OF INVENTION

Technical Problem

In the above-mentioned scanning near-field optical microscope, the near-field light generated between a measurement probe and a sample to be inspected interacts with the measurement probe to generate scattered light (transmission light) and the scattered light is detected to obtain a near-field light image effectively. An optical lever detection system is used to control the measurement probe and the back of a cantilever in which the measurement probe is mounted is irradiated with laser light, so that contact force between the measurement probe and the sample is read from change in the position of reflected light thereof. However, in the above-mentioned scanning near-field optical microscope, the following problems arise in measurement in liquid of cell, molecule or the like of an organism. In other words, when the scattered light penetrates a wall surface of a plane surface of a transparent sample cell which is filled with liquid and in which the sample such as cell, molecule or the like of the organism is held, spherical aberration occurs so that the scattered light cannot be focused on a point and it is difficult to receive the light by a photoelectric conversion element efficiently, so that a detection signal of the scattered light is reduced greatly and the SN ratio and the measurement reproducibility of the near-field light image are reduced. Further, most of the scattered light incident on the interface between the atmosphere and the liquid without penetrating the wall surface of the sample cell cannot be focused due to the total reflection on the interface, so that the SN ratio and the measurement reproducibility of the near-field light image are also reduced similarly. Moreover, when the laser light of the optical lever detection system penetrates the interface between the atmosphere and the liquid, the position of the laser light is varied due to minute fluctuation of the liquid surface and contact force between the measurement probe and the sample is varied to generate fluctuation in the detection signal of the scattered light, so that the SN ratio and the measurement reproducibility of the near-field light image are also reduced similarly. In the same way, when the laser light for generating the near-field light penetrates the interface between the atmosphere and the liquid, the position of the laser light is varied, so that the intensity of the near-field light generated is varied and the SN ratio and the measurement reproducibility of the near-field light image are reduced.

Accordingly, it is an object of the present invention to increase the detection light amount of near-field light generated in a liquid between a measurement probe and a sample to be inspected at the time of employing a scanning near-field optical microscope for measurement in the liquid and improve the SN ratio and the measurement reproducibility of a near-field light image.

Solution to Problem

In order to achieve the above object, according to the present invention, there is provided a scanning probe microscope comprising a measurement probe to make scanning on a sample to be inspected in a solution relatively, a laser light irradiation system to irradiate the measurement probe with laser light, a sample cell which near-field light generated between the measurement probe and the sample to be inspected in response to irradiation of the laser light penetrates and holds the sample to be inspected and a detector to detect the near-field light which penetrates the sample cell.

Further, according to another aspect of the present invention, there is provided a sample observation method using a scanning probe microscope comprising relatively scanning a measurement probe on a sample to be inspected in a solution, irradiating the measurement probe with laser light, generating near-field light between the measurement probe and the sample to be inspected and detecting the near-field light penetrating a sample cell which holds the sample to be inspected.

Advantageous Effects of Invention

According to the present invention, when the scanning near-field optical microscope is applied to measurement in the liquid, the detection light amount of near-field light generated between the measurement probe and the sample to be inspected in the liquid can be increased and the SN ratio and the measurement reproducibility of the near-field light image can be improved.

DESCRIPTION OF EMBODIMENTS

Embodiments are now described with reference to the accompanying drawings. In the embodiments described below, any sample to be inspected exists in liquid, although the present invention is not limited thereto but the present invention can be applied even to a sample to be inspected existing in the atmosphere.

Embodiment 1

Figure 1:
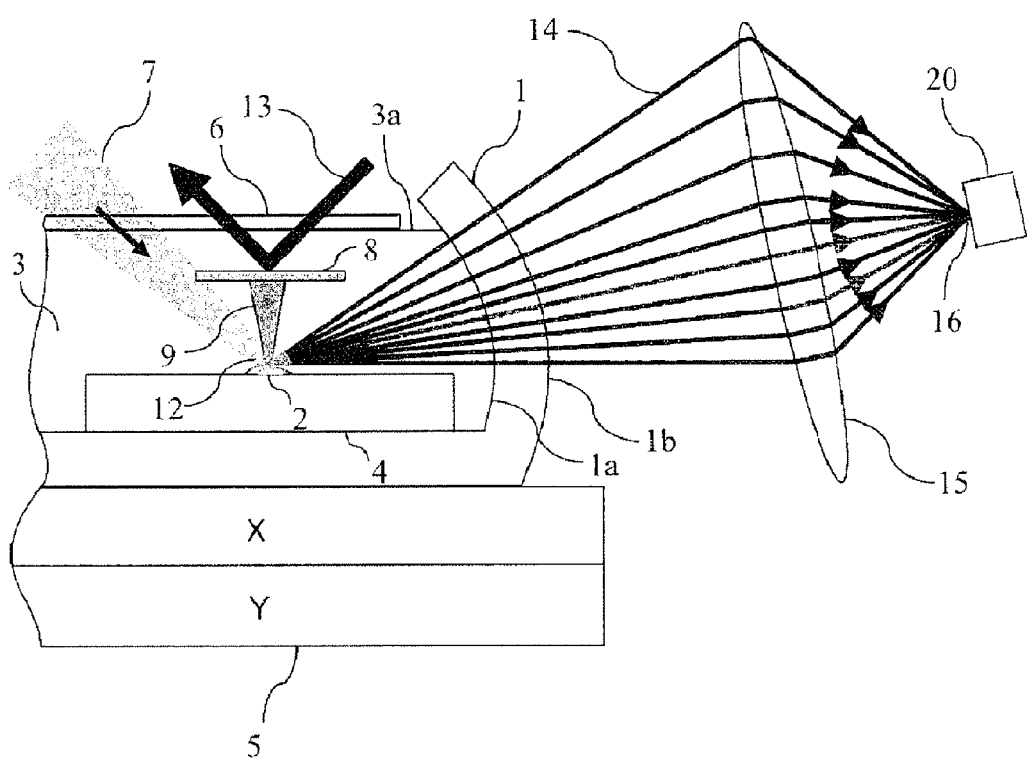
FIG. 1 is a sectional view illustrating the front of a sample cell in an embodiment 1.

A first embodiment of the present invention is described with reference to FIGS. 1 and 5. FIG. 1 is a sectional view illustrating a sample cell in which a sample to be inspected is installed in the first embodiment. In the embodiment, as shown in FIG. 1, a sample 2 to be inspected such as cell, molecule or the like of an organism exists in a solution 3 such as alcohol, water or the like. That is, the sample 2 to be inspected is put on a sample holder 4 and is held in a sample cell 1 which is filled with the solution 3. Further, the sample cell 1 is put on on XY stage 5 which is driven by an actuator such as piezoelectric element or the like. A measurement probe 9 having a narrow pointed end made of metal such as gold, silver or the like is fixedly mounted on the pointed end of a cantilever 8 and the pointed end of the measurement probe 9 is made to approach the measurement sample 2 while facing the measurement sample 2, so that a gap between the measurement probe 9 and the surface of the sample 2 is held to be substantially equal to or smaller than the diameter of the pointed end of the measurement probe 9 or the pointed end of the measurement probe 9 is made to come into contact with the surface of the sample 2 with minute contact force. Thus, when laser light 7 is radiated from obliquely above to irradiate the pointed end of the measurement probe 9 with the laser light 7, minute near-field light 12 is generated between the measurement probe 9 and the surface of the sample 2 and further scattered light (transmission light) 14 is generated by interaction between the near-field light 12 and the measurement probe 9. The gap between the measurement probe 9 and the surface of the sample 2 or the contact force therebetween is controlled by irradiating the back of the cantilever 8 with laser light 13 and measuring the position of reflected light of the laser light 13.

Here, the sample cell 1 is made of material which the scattered light 14 of the near-field light 12 penetrates and an inner surface 1a and an outer surface 1b of the side of the sample cell 1 are formed to have curved surfaces (spherical surfaces) having the center of curvature on the side of the measurement probe 9. Accordingly, the scattered light 14 goes straight without bending when the scattered light 14 passes through the interface (solid-liquid interface) between the solution 3 and the inner surface 1a and the interface (solid-atmosphere interface) between the outer surface 1b and the external atmosphere. That is, in the case of the conventional sample cell having the side formed of the plane surface, spherical aberration occurs when the scattered light passes through the side, whereas, in the embodiment, any aberration such as spherical aberration or the like does not occur in the scattered light 14 when the scattered light passes through the side of the sample cell. As a result, the scattered light 14 can be focused on a point 16 by a condensing lens 15 and be received efficiently without being spilled out from a light receiving surface of a detector 20 such as a photomultiplier tube, photodiode or the like, so that a scattered light detection signal is increased remarkably and the SN ratio and the measurement reproducibility of the near-field light image can be improved. The side of the sample cell 1 is formed to have curved surfaces having the center of curvature on the side of the measurement probe 9 and is curved an that the area of the interface between the solution 3 and the air is made small. Furthermore, a cover glass 6 is disposed above the cantilever 8 and the solution 3 reaches the lower surface of the cover glass 6 so that the interface 3a (atmosphere-liquid interface) between the liquid surface of the solution 3 and the external atmosphere is formed to have an extremely small area (leaving only the scanning range of the sample 2 generally). Consequently, the amount of scattered light incident on the atmosphere-liquid interface and reflected totally by the interface can be reduced greatly and the detection amount of the scattered light can be increased remarkably, so that the SN ratio and the measurement reproducibility of the near-field light image can be improved. Moreover, since incidence of the laser light 13 and detection of the reflected light in the optical lever detection system are performed through the interface (solid-liquid interface) between the cover glass 6 and the solution 3, the positional variation of the laser light can be suppressed greatly and the gap between the measurement probe 9 and the surface of the sample 2 or the contact force therebetween can be controlled stably with high accuracy, so that the SN ratio and the measurement reproducibility of the near-field light image can be improved. Similarly, since the pointed end of the measurement probe 9 is irradiated with the laser light 7 through the interface (solid-liquid interface) between the cover glass 6 and the solution 3, the positional variation of the laser light can be suppressed greatly and the intensity of the generated near-field light can be stabilized, so that the SN ratio and the measurement reproducibility of the near-field light image can be improved.

Figure 5:
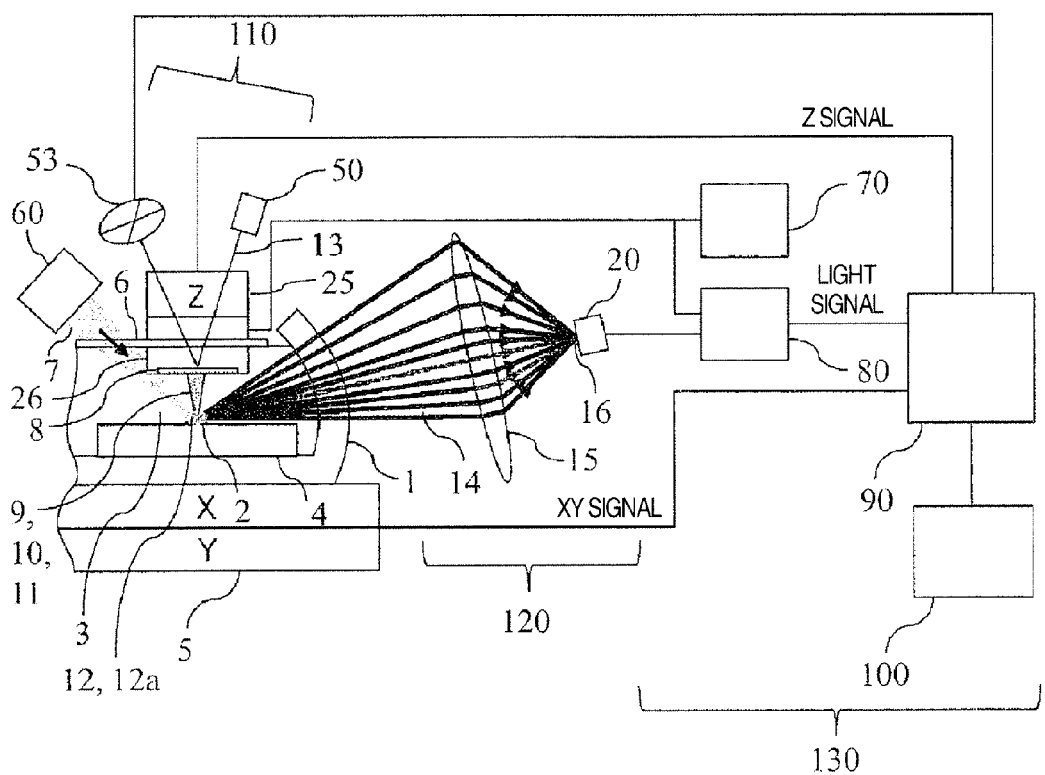
FIG. 5 is a block diagram schematically illustrating a scanning probe microscope in the embodiments 1, 2 and 3.

FIG. 5 schematically illustrates a scanning probe microscope in which the sample cell is incorporated. The scanning probe microscope includes the sample cell 1 in which the sample 2 is disposed and which detects the scattered light, the XY piezoelectric element stage 5 on which the sample cell 1 is put and which makes scanning of the sample 2 in the X and Y directions, the cantilever 8 serving as a support part having the pointed end on which the measurement probe 9 for scanning the sample 2 is fixedly mounted, a piezoelectric element actuator 26 which vibrates the cantilever 8 minutely in the Z direction, a Z piezoelectric element stage 25 for scanning the cantilever 8 in the Z direction, an optical lever detection system 110 which detects deflection of the cantilever 8 to detect the contact force between the measurement probe and the sample, an excitation laser light irradiation system 60 which irradiates the pointed end of the measurement probe 9 with the laser light 7, a scattered light detection system 120 which focuses the scattered light and converts the light into electricity and a signal processing and control system 130 which generates the near-field light image and uneven image from the obtained scattered light signal and X, Y and Z displacement signals to be outputted. The XY piezoelectric element stage 5 and the Z piezoelectric element stage 25 constitute a driving part for making scanning of the measurement probe 9 onto the sample 2 relatively.

In the optical lever detection system 110, the back of the cantilever 8 is irradiated with the laser light 13 from a semiconductor laser 50 through the cover glass 6 and the reflected light therefrom is received by a quadrisection sensor 53. The deflection amount of the cantilever 8 is detected from the positional variation of the reflected light and the contact force between the measurement probe 9 and the sample 2 is further detected from the deflection amount, so that the Z piezoelectric element stage 25 is controlled by a control part 90 of the signal processing and control system 130 in the feedback manner an as to make the contact force be equal to a previously set value at all times.

The measurement probe 9 is minutely vibrated by an oscillator 70 at the resonance frequency of the cantilever 8 in the Z direction and accordingly the generated near-field light 12 and scattered light 14 are also intensity-modulated at the same frequency. The intensity-modulated light signal produced by the detector 20 is synchronously detected by a lock-in amplifier 80 and the amplifier outputs only a frequency component. The scattered light in the background which is directly scattered at the root of the measurement probe and the surface of the sample by the excitation laser light 7 is a DC component which does not react to the minute vibration of the cantilever 8 and accordingly is not contained in the output signal of the lock-in amplifier 80. Thus, background noise can be suppressed and only the near-field light component can be detected selectively. Harmonic components such as double waves and treble waves of the resonance frequency can be detected to further improve the SN ratio of the signal.

The light signal from the lock-in amplifier 80 is sent to the control part 90 of the signal processing and control system 130 and is combined with the XY signal from the XY piezoelectric element stage 5 to produce the near-field light image to be supplied to a display 100. At the same time, the Z signal from the Z piezoelectric element stage 25 is also combined with the XY signal in the control part 90 to produce the uneven image of the surface of the sample to be supplied to the display 100.

According to the embodiment, since the side of the sample cell 1 is formed to have the curved surfaces of which the center of curvature is positioned on the side of the measurement probe 9, aberration such as spherical aberration or the like can be suppressed from being produced in the scattered light 14 at the time that the scattered light passes through the side of the sample cell 1 and the scattered light 14 can be focused on one point by the condensing lens 15. Thus, the detection signal of the scattered light can be increased remarkably and the SN ratio and the measurement reproducibility of the near-field light image can be improved. Further, the near-field light (scattered light 14) is made to penetrate the sample cell 1 instead of the interface between the solution 3 and the air to be detected. Moreover, the side of the sample cell 1 is curved so that the area of the interface between the solution 3 and the air is made small. Thus, the amount of the scattered light incident on the atmosphere-liquid interface and reflected totally therefrom can be reduced greatly and the detection amount of the scattered light can be increased remarkably, so that the SN ratio and the measurement reproducibility of the near-field light image can be improved. In addition, since incidence of the laser light 13 and detection of the reflected light in the optical lever detection system are performed through the interface (solid-liquid interface) between the cover glass 6 and the solution 3, the positional variation of the laser light can be suppressed greatly and the gap between the measurement probe 9 and the surface of the sample 2 or the contact force therebetween can be controlled stably with high accuracy, so that the SN ratio and the measurement reproducibility of the near-field light image can be improved. Similarly, the positional variation of the laser light 7 for generating the near-field light can be suppressed greatly and the intensity of the generated near-field light can be stabilized, so that the SN ratio and the measurement reproducibility of the near-field light image can be improved.

Consequently, measurement of optical information, spectral information and uneven information of the surface of the sample in the liquid can be made with resolution in nanometer order and with the high SN ratio and high measurement reproducibility. As a result, the form and the function of cell or molecule of an organism in the liquid can be imaged in vitro by means of the optical information, the spectral information and the uneven information with resolution of nanometer and contribution can be made to support of genome drug development in a molecule level and practical implementation of regenerative medicine by detailed understanding of generation and differentiation processes.

Embodiment 2

Figure 2:
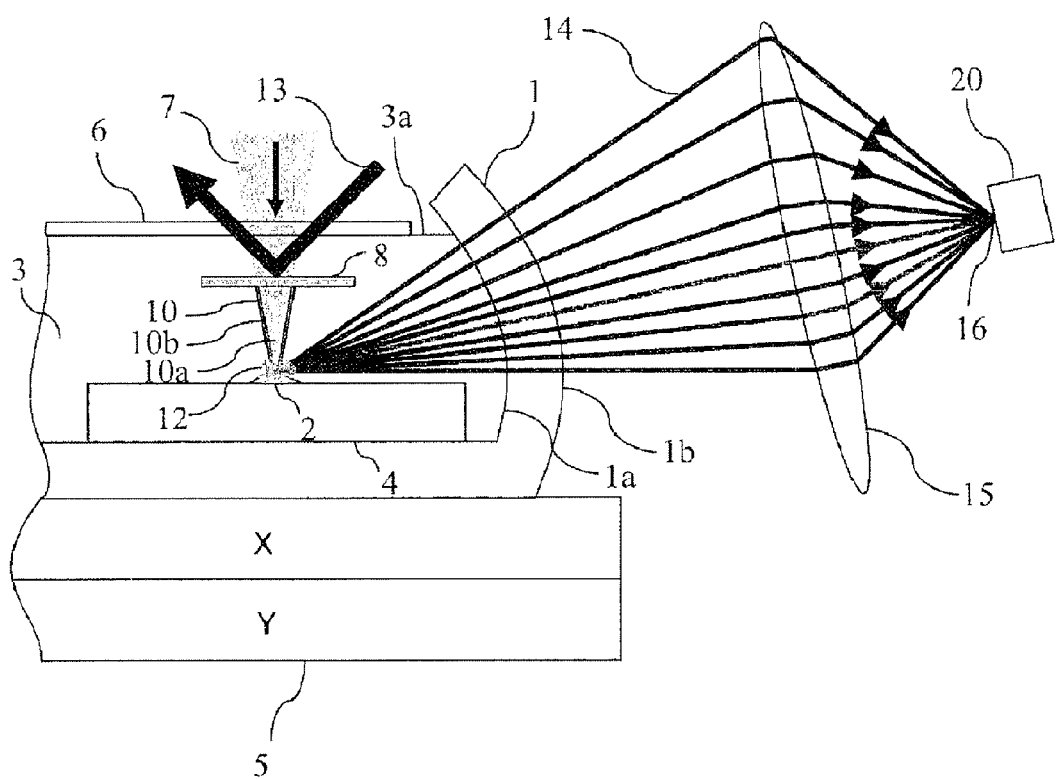
FIG. 2 is a sectional view illustrating the front of a sample cell in an embodiment 2.

A second embodiment of the present invention is described with reference to FIGS. 2 and 5. FIG. 2 is a sectional view illustrating a sample cell in which a sample to be inspected is installed in the second embodiment. The form of the sample cell 1 and the function thereof are the same as the first embodiment and accordingly description thereof is omitted. In this embodiment, the form of the measurement probe is different. A measurement probe 10 includes a quartz fiber 10a having a narrow pointed end opposite to the sample 2 and a periphery coated with metal film 10b made of gold, silver or the like and the metal film on only the pointed end opposite to the sample 2 is removed to form a minute opening. When laser light 7 is radiated from above (from the opposite side to the side where the sample 2 is disposed in the measurement probe 10) of the quartz fiber 10a, the near-field light 12 is generated from the opening at the pointed end of the measurement probe 10 and further scattered light (transmission light) 14 is produced by interaction between the near-field light 12 and the measurement probe 10.

FIG. 5 schematically illustrates the scanning probe microscope in which the sample cell is installed. The configuration and the function of this scanning probe microscope are the same as the first embodiment and accordingly description thereof is omitted.

In the embodiment, since the laser light 7 is radiated through the quartz fiber 10a so that the near-field light 12 is generated, there is a merit that influence of background noise is small as compared with the first embodiment in which the pointed end of the measurement probe is irradiated with the laser light 7.

Embodiment 3

Figure 3:
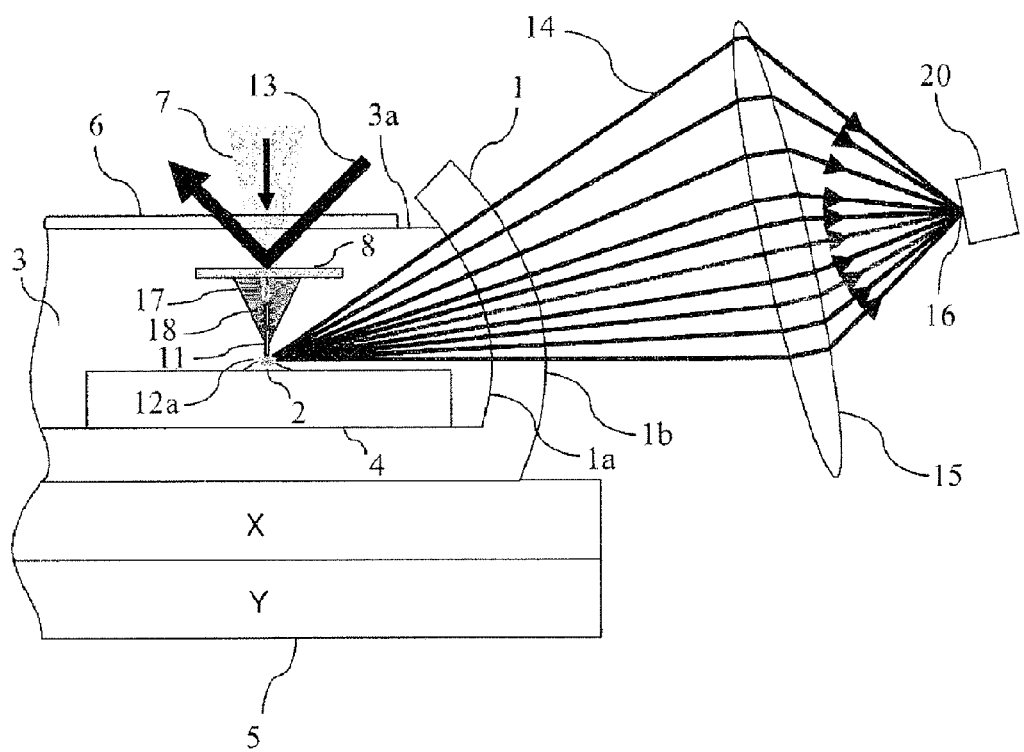
FIG. 3 is a sectional view illustrating the front of a sample cell in an embodiment 3.

A third embodiment of the present invention is described with reference to FIGS. 3 and 5. FIG. 3 is a sectional view illustrating a sample cell in which a sample to be inspected is installed in the third embodiment. The form of the sample cell 1 and the function thereof are the same as the first embodiment and accordingly description thereof is omitted. In this embodiment, the form of the measurement probe is different. A measurement probe 11 includes a carbon nanotube (CNT) of which a pointed end is opposed to the sample 2 and has a diameter which is narrowed to be equal to several nm. The CNT may be filled with gold or silver nanostructure. The measurement probe 11 is fixedly mounted on a front ridgeline of a triangular pyramidal chip 17 coated with metal film of gold or silver and formed at the pointed end of the cantilever 8 and is irradiated with excitation laser light 7 from obliquely above (from the opposite side to the side where the sample 2 is disposed in the measurement probe 22). The irradiation of the laser light 7 produces collective vibration of free electrons in the metal film on the surface of the chip 17 (plasmon) and, as shown by broken line in FIG. 3, the collective vibration is transmitted as surface plasmon 18 from the upper end of the CNT (from the opposite side to the side where the sample 2 is disposed in the measurement probe 22) to the lower end (to the side where the sample 2 is disposed), so that an electric field is concentrated on the pointed end of the CNT to generate near-field light 12a. Further, the scattered light (transmission light) 14 is generated by the interaction between the near-field light 12a and the measurement probe 11.

FIG. 5 schematically illustrates the scanning probe microscope in which the sample cell is incorporated. The configuration and the function of this scanning probe microscope are the same as the first embodiment and accordingly description thereof is omitted.

In the embodiment, since the CNT having the pointed end of which the diameter is equal to several nm is used as the measurement probe 11, the spatial resolution is several nm and is improved as much as about ten times as compared with the first and second embodiments.

Embodiment 4

Figure 4:
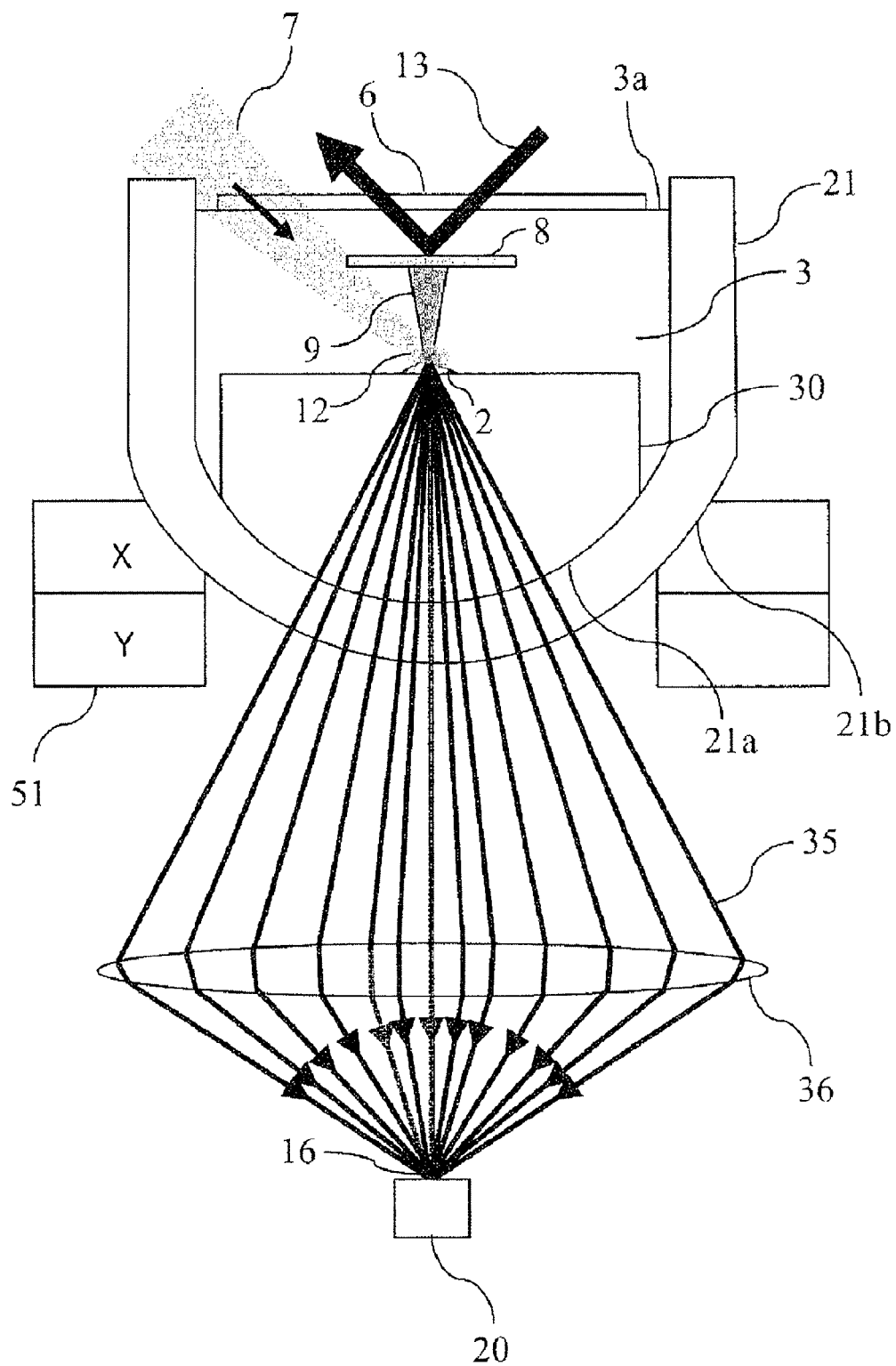
FIG. 4 is a sectional view illustrating the front of a sample cell in an embodiment 4.

A fourth embodiment of the present invention is described with reference to FIGS. 4 and 6. FIG. 4 is a sectional view illustrating a sample cell in which a sample to be inspected is installed in the fourth embodiment. In this embodiment, as shown in FIG. 4, a sample 2 to be inspected is put on a sample holder 30 and held in a sample cell 21 filled with a solution 3. Further, the sample cell 21 is mounted on an XY stage 51 driven by an actuator such as piezoelectric element or the like and having an opening formed in the center.

In the embodiment, the sample cell 21 is made of material which scattered light 35 penetrates and an inner surface 21a and an outer surface 21b of the bottom thereof are formed to have spherical surfaces of which the center of curvature is positioned on the side of the measurement probe 9. Accordingly, the scattered light 35 goes straight without bending when the scattered light 35 passes through the interface (solid-liquid interface) between the solution 3 and the inner surface 21a and the interface (solid-atmosphere interface) between the outer surface 21b and the external atmosphere.

Figure 6:
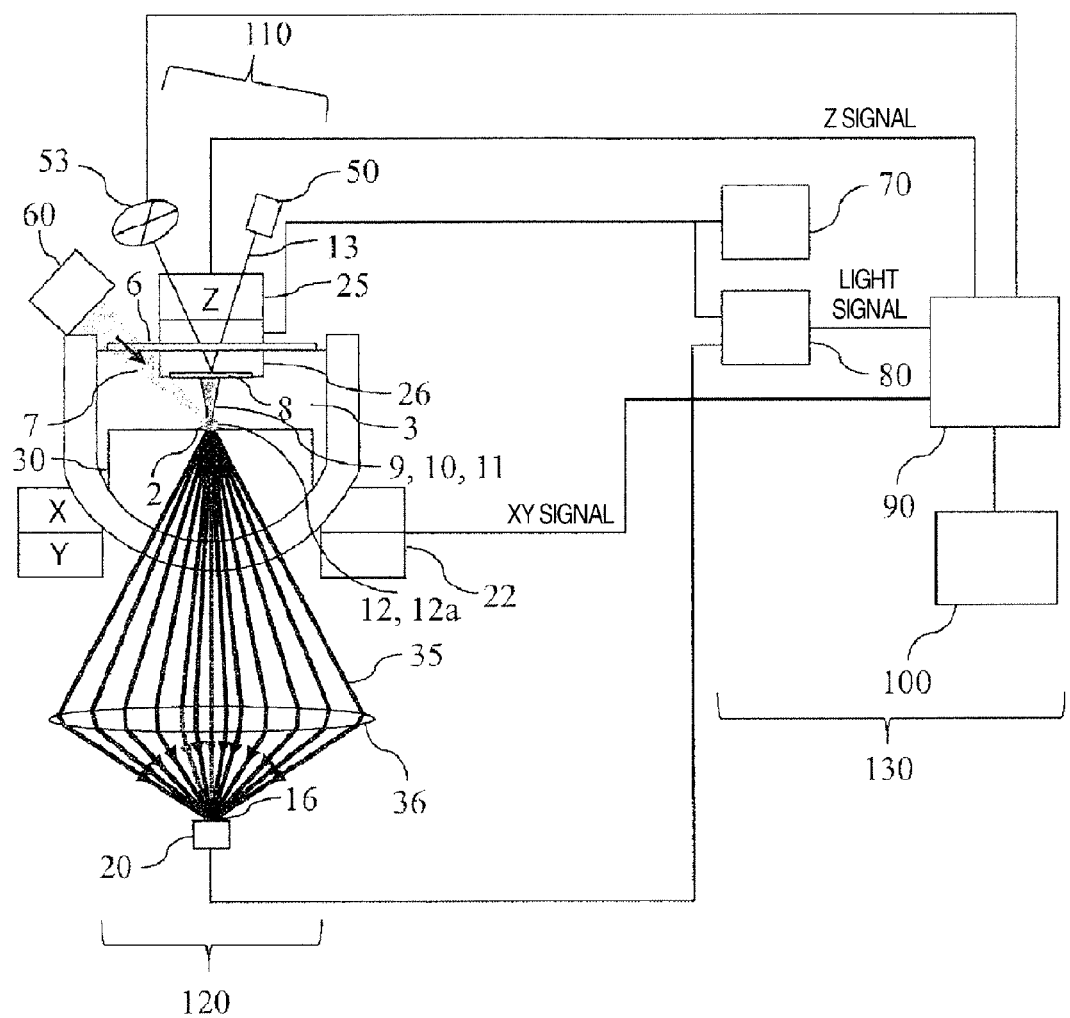
FIG. 6 is a block diagram schematically illustrating a scanning probe microscope in the embodiment 4.

FIG. 6 schematically illustrates a scanning probe microscope in which the sample holder is incorporated. In this scanning probe microscope, the configuration except the sample cell 21 and the function thereof are the same as the first embodiment and accordingly description thereof is omitted.

In the embodiment, since the near-field light is detected from the bottom of the sample cell as shown in FIG. 4, an angle for detection of the near-field light is not limited by the scanning range of the sample 2 and accordingly the near-field light having a larger angle can be detected as compared with the case where the near-field light is detected from the side as described in the first to third embodiments. Thus, the numerical aperture (NA) for detection can be increased and the detection amount of the scattered light can be increased remarkably, so that the SN ratio and the measurement reproducibility of the near-field light image can be improved.

Further, the present invention is not limited to the above-mentioned embodiments and may contain various modification examples. For example, the above embodiments have been described in detail in order to easily understand the present invention but the present invention is not necessarily limited to the embodiments including all constituent elements described. Moreover, a part of the configuration of a certain embodiment may be replaced by the configuration of another embodiment and the configuration of another embodiment may be further added to the configuration of a certain embodiment. In addition, a part of the configuration of the embodiments may be subjected to addition, deletion and replacement of other configuration.

For example, there has been described that any excitation laser light 7 is monochromatic light, although the present invention is not limited thereto but laser light having 3 wavelengths of red, green and blue may be used to make color near-field imaging. Further, white laser light and a spectroscope may be used to make near-field spectrometry and near-field Raman spectrometry which detects, for example, Raman-shifted wavelength instead of the same wavelength as the excitation laser light.

REFERENCE SIGNS LIST 1, 21 . . . sample cell
2 . . . sample
3 . . . solution
4 . . . sample holder
5, 51 . . . XY piezoelectric element stage
6 . . . cover glass
7 . . . laser light
8 . . . cantilever
9, 10, 11 . . . measurement probe
12, 12a . . . near-field light
14, 35 . . . scattered light
20 . . . detector
25 . . . Z piezoelectric element stage
26 . . . piezoelectric element actuator
60 . . . excitation laser light irradiation system
70 . . . oscillator
80 . . . lock-in amplifier
90 . . . control part
100 . . . display
110 . . . optical lever detection system
120 . . . scattered light detection system
130 . . . signal processing and control system

The invention claimed is:

1. A scanning probe microscope comprising:
    a measurement probe to make scanning on a sample to be inspected in a solution relatively;
    a laser light irradiation system to irradiate the measurement probe with laser light;
    a sample cell which near-field light generated between the measurement probe and the sample to be inspected in response to irradiation of the laser light penetrates and holds the sample to be inspected; and
    a detector to detect the near-field light which penetrates the sample cell,
    wherein the surface of the sample cell is formed to have a curved surface, and wherein the curved surface of the surface of the sample cell has the center of curvature on the side of the measurement probe.

2. A scanning probe microscope according to claim 1, wherein
the detector detects near-field light penetrating the side of the sample cell and the side of the sample cell is curved in the direction that area of an interface between the solution and air is made small.

3. A scanning probe microscope according to claim 1, wherein
the detector detects near-field light penetrating the bottom of the sample cell.

4. A scanning probe microscope according to claim 1, wherein
the measurement probe has a narrow pointed end directed to the sample to be inspected and
the laser light irradiation system irradiates the pointed end of the measurement probe with the laser light.

5. A scanning probe microscope according to claim 1, wherein
the measurement probe has a pointed end directed to the sample to be inspected and in which a minute opening is formed and
the laser light irradiation system irradiates the opposite side to the sample to be inspected of the measurement probe with the laser light to generate the near-field light from the minute opening.

6. A scanning probe microscope according to claim 1, wherein
the laser light irradiation system irradiates the opposite side to the sample to be inspected of the measurement probe with the laser light, so that surface plasmon is generated in the measurement probe and is transmitted to the pointed end directed to the sample to be inspected.

7. A sample observation method using a scanning probe microscope comprising:
relatively scanning a measurement probe on a sample to be inspected in a solution;
irradiating the measurement probe with laser light;
generating near-field light between the measurement probe and the sample to be inspected; and
detecting the near-field light having penetrated a sample cell which holds the sample to be inspected,
wherein the surface of the sample cell is formed to have a curved surface, and
wherein the curved surface of the surface of the sample cell has the center of curvature on the side of the measurement probe.

8. A sample observation method using a scanning probe microscope according to claim 7, wherein
the near-field light penetrates the side of the sample cell and the side of the sample cell is curved in the direction that area of an interface between the solution and air is made small.

9. A sample observation method using a scanning probe microscope according to claim 7, wherein
the near-field light penetrates the bottom of the sample cell.

10. A sample observation method using a scanning probe microscope according to claim 7, wherein
the pointed end of the measurement probe directed to the sample to be inspected is irradiated with the laser light.

11. A sample observation method using a scanning probe microscope according to claim 7, wherein
the opposite side to the sample to be inspected of the measurement probe is irradiated with the laser light to generate the near-field light from a minute opening formed in the pointed end of the measurement probe directed to the sample to be inspected.

12. A sample observation method using a scanning probe microscope according to claim 7, wherein
the opposite side to the sample to be inspected of the measurement probe is irradiated with the laser light, so that surface plasmon is generated in the measurement probe and is transmitted to the pointed end directed to the sample to be inspected.

* * * * *